United States Patent

[11] 3,578,163

| [72] | Inventor | Theodore J. Warning<br>Walnut, Calif. |
|---|---|---|
| [21] | Appl. No. | 809,757 |
| [22] | Filed | Mar. 24, 1969 |
| [45] | Patented | May 11, 1971 |
| [73] | Assignee | U. S. Filter Corp.<br>Whittier, Calif. |

[54] METHOD AND APPARATUS FOR PRECOATING FILTER LEAVES
19 Claims, 6 Drawing Figs.

[52] U.S. Cl. .................................................. 210/75,
210/327, 210/396
[51] Int. Cl. ................................................... B01d 37/02
[50] Field of Search............................................ 210/75, 77,
193, 327, 396

[56] References Cited
UNITED STATES PATENTS

| 2,102,780 | 12/1937 | Bielfeldt...................... | 210/75 |
|---|---|---|---|
| 2,576,288 | 11/1951 | Fink et al..................... | 210/75 |
| 3,362,533 | 1/1968 | Muller.......................... | 210/75 |

*Primary Examiner*—Samih N. Zaharna
*Attorney*—Christie, Parker and Hale

ABSTRACT: A layer of precoat material is applied to a rotary filter leaf prior to the filtration process. Filter cake accumulates on the leaf during filtering operations, and at the end of the filtration cycle the cake is removed by an adjustable knife blade so that the precoat layer remains on the leaf. The precoat material is then sluiced from the leaf, reslurried, and reapplied to the leaf to serve as the precoat layer for the next filtration cycle.

Patented May 11, 1971

INVENTOR.
THEODORE J. WARNING
BY
Christie, Parker & Hale
ATTORNEY

Patented May 11, 1971

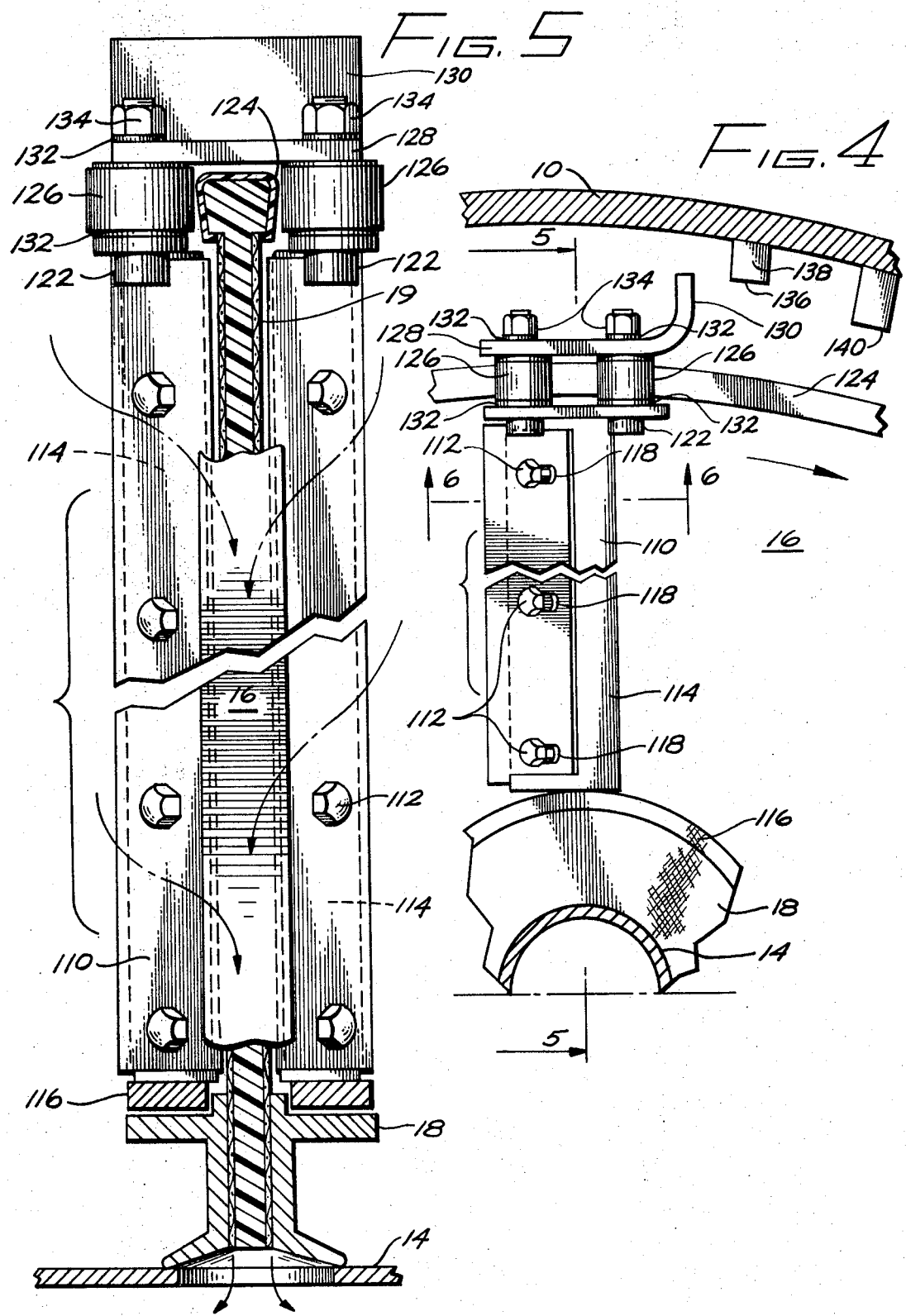

METHOD AND APPARATUS FOR PRECOATING FILTER LEAVES

BACKGROUND OF THE INVENTION

This invention relates to improvements in pressure leaf filters, and more particularly to an improved method and apparatus for applying precoat material to a filter leaf.

The conventional liquid filtration apparatus comprises a plurality of vertically disposed filter leaves mounted on a hollow rotatable shaft within a cylindrical tank or shell. Unfiltered liquid is introduced into the shell under pressure and forced through the leaves. The solids suspended in the liquid accumulate on the leaves as a cake, and the filtered liquid is delivered into the hollow shaft for collection. A typical filter leaf comprises a solid central backing plate covered by a porous cloth or "septum." To improve the filtering capabilities of the leaves, a thin layer of fibrous material or "filter aid" is applied as a "precoat" to the septum prior to filtration. The precoat of filter aid, usually asbestos fiber or diatomaceous earth, increases clarity of filtration and prevents the leaves from becoming clogged by solids which increase the resistance of the septum.

During the filter cycle, the cake buildup on the leaves eventually interferes with filtering efficiency. Therefore, the cake is periodically removed from the leaves to restore them to a clean condition for the next filtration cycle. When cleaning operations are completed, a new precoat layer is applied to the leaves. In conventional pressure leaf filters, the filter cake and the precoat layer are completely removed from the leaves during cleaning. Removal is usually accomplished by emptying the shell and directing a spray of cleaning liquid under pressure onto the leaf surfaces. The filter cake, including the layer of precoat material, falls to the bottom of the shell and is discharged by suitable means. A slurry of new filter aid is then introduced into the shell and applied to the leaves as the precoat layer for the next cycle.

SUMMARY OF THE INVENTION

The method and apparatus of this invention permit reuse of the same precoat materials for successive filtration cycles. This represents a substantial cost savings because the materials commonly used to precoat filter leaves are relatively expensive.

In terms of method, this invention contemplates a rotary filter leaf disposed within the shell of a liquid filtration apparatus. A layer of precoat material is applied to the surface of the leaf at the beginning of the filtration cycle. Liquid to be filtered is then introduced into the shell and forced through the leaf. The solids suspended in the liquid accumulate on the surface of the precoat layer as a cake which is periodically removed to improve filtering efficiency. During cleaning, the liquid is discharged from the shell while the filter cake remains on the leaf. The cake is then removed so that a substantial portion of the precoat layer remains on the leaf. Filter cake removal is preferably accomplished by an elongate knife blade disposed adjacent the face of the leaf. The spacing between the blade edge and the leaf is preferably adjustable to control the thickness of precoat material left on the leaf. After the filter cake is removed from the leaf, it is discharged from the shell. In the preferred form of the invention, the precoat layer is then removed from the leaf and slurried by spray means which project liquid onto the leaf surface. This allows the shell to be refilled at the same time in preparation for the next filtration cycle, thus effecting a substantial savings of filtration time. The removed precoat material is then reapplied to the leaf as the precoat layer for the next cycle.

In terms of apparatus, this invention includes a rotary filter leaf disposed within the shell of a liquid filtration apparatus. Means are provided for applying a layer of precoat material to the leaf and for forcing liquid into the leaf to form a cake on the precoat layer. An adjustable elongated knife blade is disposed adjacent the face of the leaf to cut the filter cake off the leaf so that a substantial portion of the precoat material remains on the leaf surface.

In the preferred form of the invention, the knife blade extends outwardly from the central portion of the leaf to its periphery and becomes embedded in the filter cake during the filtration process. Means are provided for rotating the leaf so that the embedded knife blade rotates with the leaf until it engages stop means secured to the interior of the shell. This prevents the blade from rotating with the leaf so that the filter cake is cut off the leaf by the blade as the leaf rotates relative to the blade. The spacing between the blade edge and the leaf is adjustable so that the precoat layer left on the leaf can be set to the desired thickness.

Means are provided for discharging the removed filter cake from the shell. Means are then provided for removing the remaining precoat layer from the leaf and for slurrying the removed precoat material. The precoat layer is preferably removed and slurried by spray means disposed within the shell for projecting a spray of liquid against the surface of the leaf. Preferably, the spray means are used to refill the shell for the next filtration cycle while the precoat layer is being removed and slurried. Means are provided for reapplying the removed precoat material to the leaf to serve as the precoat layer for the succeeding filtration cycle.

BRIEF DESCRIPTION OF THE DRAWINGS

FIG. 4 is a fragmentary plan elevational view of the knife blade;

FIG. 5 is a sectional elevational view taken on line 5–5 of FIG. 4; and

DESCRIPTION OF THE PREFERRED EMBODIMENT

Figure 1:
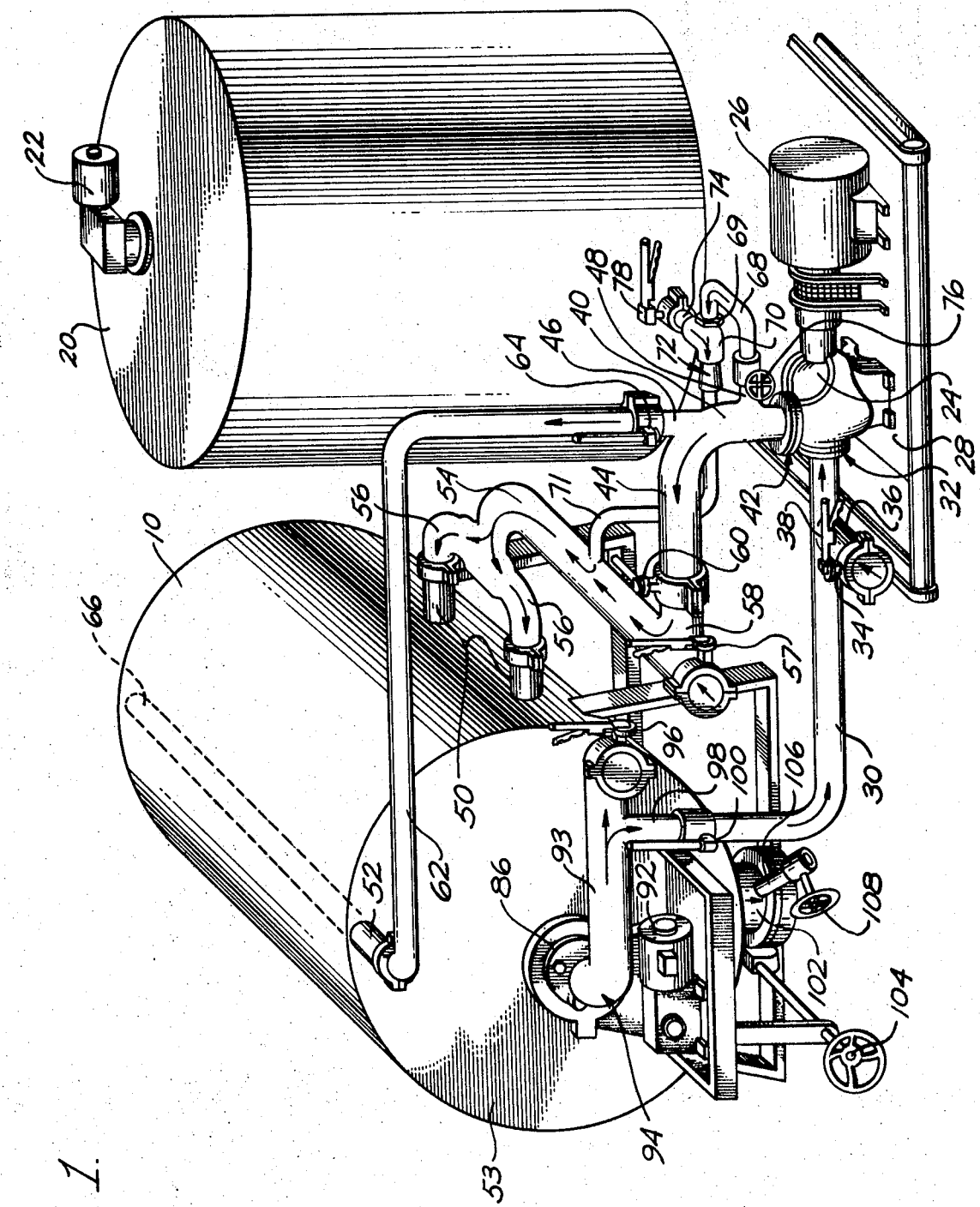
FIG. 1 is a perspective view showing the filtration system of this invention.

Referring to the drawings, a liquid filtering system includes a horizontally disposed cylindrical filtration tank or shell 10 with a longitudinal V-shaped trough 12 at its bottom. An elongated, hollow rotatable shaft 14 is centrally disposed within the shell. A plurality of circular filter leaves 16 are vertically mounted on the shaft. Each leaf is secured to a hub 18 which is keyed on the shaft so that the hub and the leaves rotate with the shaft. During the filter cycle, unfiltered liquid is introduced into the shell and forced under pressure against the sides of the filter leaves. The liquid passes down through a filtering cloth or septum 19 (FIG. 5) that covers the outer surface of each leaf, and into the interior of shaft 14 for collection.

An upright cylindrical tank 20 is located adjacent the shell and is used for preparing the mixture of precoat material to be applied to the filter leaves. The precoat slurry comprise filter aid, such as diatomaceous earth, suspended in a suitable liquid. A slow-speed agitator 22 mounted on the top of slurry tank 20 keeps the filter aid constantly suspended in the liquid.

A pump 24 and pump motor 26 are mounted on a floor skid 28 adjacent the front of slurry tank 20. An elongated elbow pipe 30 leading from the shell is connected to the intake 32 of the pump. Flow into the pump is controlled by an inlet valve 34 connected to an inlet pipe 36 which leads into the side of return pipe 30 near the pump intake. Valve 34 is a butterfly valve having a pair of pivotally mounted internal flaps (not shown) which are manually opened or closed by an outwardly extending valve stem 38. A pump output manifold 40 having three outlets is connected to the output 42 of the pump. The manifold comprises a large outwardly extending outlet pipe 44, a medium sized upwardly extending outlet 46, and an outwardly projecting, small diameter outlet 48.

Liquid is admitted to the interior of the shell through a pair of large-area main inlet pipes 50 which extend through the side of the shell, and a smaller sized auxiliary inlet pipe 52 which extends through the end wall 53 of the shell near its top. An elongated, large-area main inlet manifold 54 is disposed adjacent the side of the shell and terminates in a pair of outwardly extending elbow pipes 56 coupled to the main inlet pipes. A pair of baffles (not shown) are disposed within the shell adjacent the openings provided by the main inlet pipes to diffuse the flow of liquid into the shell. A butterfly valve 57 is connected to the intake of the main inlet manifold to control the flow of liquid into the manifold. A large-area inlet pipe 58 leads into the side of the main inlet manifold, and is coupled at its other end to pump manifold outlet 44. The flow line from the pump to the main inlet manifold is controlled by a butterfly valve 60 located at the coupling between pipes 58 and 44. An upwardly extending elbow pipe 62 is coupled at one end to pump manifold outlet 46 and at the other end to auxiliary inlet pipe 52. Pipe 62 provides an auxiliary flow line from the pump to the interior of the shell. Flow through this line is controlled by a butterfly valve 64 located at the coupling between pump manifold outlet 46 and pipe 62. Auxiliary pipe 52 extends through a packing gland (not shown) which makes a pressuretight fit in the endwall of the shell. A longitudinally extending overhead spray header 66 is connected to the packing gland and disposed within the upper interior of the shell. Liquid pumped into the shell through the auxiliary flow line is sprayed onto the filter leaves by the overhead spray header.

Pump manifold outlet 48 is coupled to a small-diameter, U-shaped pipe 68 which is connected at its opposite end to intake 69 of an eductor 70 disposed adjacent the bottom side of the slurry tank. An upwardly extending, small-area elbow pipe 71 is connected at one end to output 72 of the eductor and leads into the side of the main inlet manifold. An outlet pipe 74 extends outwardly from the bottom of the slurry tank and leads into the side of the eductor. Flow through the eductor via eductor pipes 68 and 71 withdraws filter aid from the slurry tank through outlet pipe 74. The filter aid is then delivered to the main inlet manifold by eductor outlet pipe 71. Flow through the eductor is controlled by a gate valve 76 located at the coupling between pump manifold outlet 48 and eductor inlet pipe 68. Filter aid flow out of the slurry tank is controlled by a butterfly valve 78 connected to slurry tank outlet pipe 74.

Filter leaf shaft 14 is journaled at one end within a bearing 80 and at the other end in a hanger 82 suspended from the upper interior wall of the shell. Bearing 80 extends out through an axially disposed opening 84 in endwall 53 of the shell. The bearing terminates in an outer flange 86, and the end of shaft 14 is journaled in the flange. A portion of bearing 80 is slotted to allow connection of a drive sprocket 88 to shaft 14. An endless roller chain 90 is engaged with the sprocket, and a drive motor 92 disposed exteriorly of the shell is connected to the chain to rotate the filter leaf shaft. An elongated, large-area outlet manifold 93 extends laterally outward from the central opening 84 in end wall 53 of the shell. The intake 94 of the manifold comprises an elbow section which is connected to flange 86. Thus, filtered liquid collected in shaft 14 flows out of the shell through manifold 93. The manifold terminates in an outlet butterfly valve 96 which controls the flow of liquid from the shell. A downwardly projecting outlet pipe 98 leads away from the bottom side of the outlet manifold and is coupled to elbow pipe 30 to provide a return flow line from the outlet manifold to pump 24. Flow in this line is controlled by a butterfly valve 100 located at the coupling between pipes 98 and 30.

A large-area drain pipe 102 projects downwardly from the underside of the shell to provide a discharge path for liquid and filter cake removed from the shell. Flow out of the drain pipe is controlled by a gate valve 104. An outwardly projecting auxiliary drain pipe 106 is connected to the side of drain pipe 102 to provide an alternate flow path for material discharged from the shell. Flow out of this pipe is controlled by a gate valve 108.

The filter cake which accumulates on the leaves during the filtration process is removed by a plurality of elongated knife blades 110 disposed adjacent the face of each leaf. Each knife blade is secured by bolts 112 to a flat, elongated carrying bar 114 welded at its inner end to a sleeve 116 which makes a loose fit around hub 18. The bolts pass through a series of spaced-apart slotted holes 118 in the blade, and are screwed into threaded holes 120 in the carrying bar. The slotted holes enable the blade to be moved toward or away from the leaf surface to set the desired thickness of cake remaining on the leaf. Typically, the blade is set to be spaced approximately one-sixteenth inch from the leaf. A pair of laterally spaced shafts 122 are welded to the end of the carrying bar and project outwardly past the outer rims 124 of the filter leaf. A separate roller 126 is mounted on each of the shafts 122 to ride on the outer rim of the leaf. A flat, L-shaped bracket 128 having an outward projecting arm 130 is secured to the ends of the shafts by washers 132 and hex nuts 134. The bracket spans the periphery of the filter leaf and is similarly secured to another carrying bar and knife blade of identical construction mounted on the opposite face of the leaf.

Operation of the filtration system is initiated by filling the shell with clean liquid delivered to pump 24 from a separate storage tank (not shown). The liquid is delivered to the pump through a delivery line (not shown) which is coupled to inlet pipe 36 through valve 34. During the fill sequence, valves 57, 64 and 78 are closed, and valves 34 and 60 are opened, and the liquid is pumped through outlet pipe 44 and through main inlet manifold 54 into the baffled main inlet pipes 50. Outlet valves 96 and 100 are also closed to prevent outflow of liquid while the shell is being filled.

After the shell is filled, the filter leaves are precoated with a layer of filter aid withdrawn from the slurry tank and circulated through the shell. Inlet valves 34 and 60 remain open and valve 64 remains closed during the precoat circulation sequence so that clean liquid is pumped into the shell through main inlet manifold 54. Gate valve 76 and slurry tank outlet valve 78 are opened so that filter aid is withdrawn from the slurry tank by eductor 70 and delivered to the shell through eductor pipe 71 and the main inlet manifold. Outlet valve 96 remains closed and valve 100 is opened to provide a return flow path for liquid from the shell through return pipe 30 and into pump 24 for recirculation. During the precoat circulation sequence clean liquid, with proper amounts of filter aid added to it, is continuously pumped into the shell under pressure and forced through the leaves to deposit a layer of precoat on the leaves. Precoat circulation is preferably terminated after a layer of filter aid approximately 1/16 to ⅛-inch thick is deposited.

The filter sequence is initiated by delivering unfiltered liquid to the shell under pressure and forcing it through the leaves. Filtered liquid is discharged from the shell through the hollow filter leaf shaft, and solids removed during the filtration process accumulate on the leaves as a cake. The filtering action of the leaves is improved by adding controlled amounts of filter aid or "body feed" to the unfiltered liquid from the slurry tank during the filter sequence. The addition of body feed maintains filter cake porosity because the new filter aid becomes deposited on the leaves with the filter cake and offsets the plugging tendency of the solids suspended in the unfiltered liquid. Liquid to be filtered is pumped from a second storage tank (not shown) by a pump (not shown) through a delivery line (not shown) which is coupled to the intake of the main inlet manifold through valve 57. The liquid used to deliver the body feed to the shell is delivered to pump 24 from the clean liquid storage tank (not shown) through valve 34 and inlet pipe 36. Valve 57 is opened and valve 60 is closed and unfiltered liquid is forced into the shell through the main inlet manifold and the baffled main inlet pipes. Valve 100 is closed and valve 96 is opened, and filtered liquid passes from the shell through outlet manifold 93 and outlet valve 96 into a discharge line (not shown) for delivery to a third storage tank (not shown). During the filter sequence inlet valve 34 is opened, and gate valve 76 is opened to provide the proper flow rate of clean liquid through the eductor. Slurry tank outlet valve 78 is opened and a controlled amount of body feed is delivered through eductor pipe 71 to the main inlet manifold and mixed with the unfiltered liquid being fed to the shell.

The filter cake which builds up on the exterior of the leaves during the filter sequence must be removed periodically to maintain filtering efficiency. Thus, filtration is periodically terminated by closing inlet valves 34 and 57 and outlet valve 96. Cake removal is generally initiated by a "blowdown" step wherein the unfiltered liquid remaining in the shell is forced out of the shell under pressure. Gate valve 104 is closed and side gate valve 108 is opened and air is forced into the shell from a compressor (not shown) through an air inlet nozzle (not shown) located at the top of the shell. The air pressure within the shell forces the liquid out through side drain pipe 106 while the filter cake remains intact on the leaves. After the liquid is completely removed from the shell, the filter cake is dried by continuing to force air through the shell. Side gate valve 108 is shut off and main outlet valve 96 is opened, and air from the overhead nozzle is forced through the shell.

After the filter cake is blown dry, it is removed from the leaves in preparation for the next filtration cycle. The conventional method of cleaning filter leaves is to completely remove the filter cake, including the precoat layer, from the leaves. Cleaning is usually accomplished by spraying or "sluicing" the leaves with cleaning fluid from an overhead spray header disposed within the shell. The removed cake is then discharged from the shell, the shell is filled, and a new layer of filter aid is applied to the leaves as the precoat for the next filtration cycle. This invention contemplates reuse of the same precoat materials for the succeeding filtration cycle. During the filter cake removal sequence, the adjustable knife blades 110 remove all accumulated cake down to and slightly into the precoat layer. The removed cake is then discharged from the shell, and the layer of filter aid remaining on the leaves is removed, reslurried within the shell, and reapplied to the leaves for reuse as the precoat layer for the next filtration cycle.

During filtration process, the filter leaf is held stationary and the knife blade hangs free as the filter cake builds up around it on the leaf. During the cake removal sequence, the filter leaf shaft is rotated in the direction indicated by the arrows in FIGS. 3 and 4. The leaf rotates with the blade embedded in the cake until bracket 128 strikes a stop 136 welded to the interior surface of the shell. The stop is an elongated bar disposed longitudinally along the inner surface of the shell on legs 138 so that it projects outwardly from the shell a distance sufficient to engage the bracket. When the blade engages the stop, it remains stationary while the leaf rotates under it to cut off the filter cake which falls into the trough at the bottom of the shell.

Figure 3:
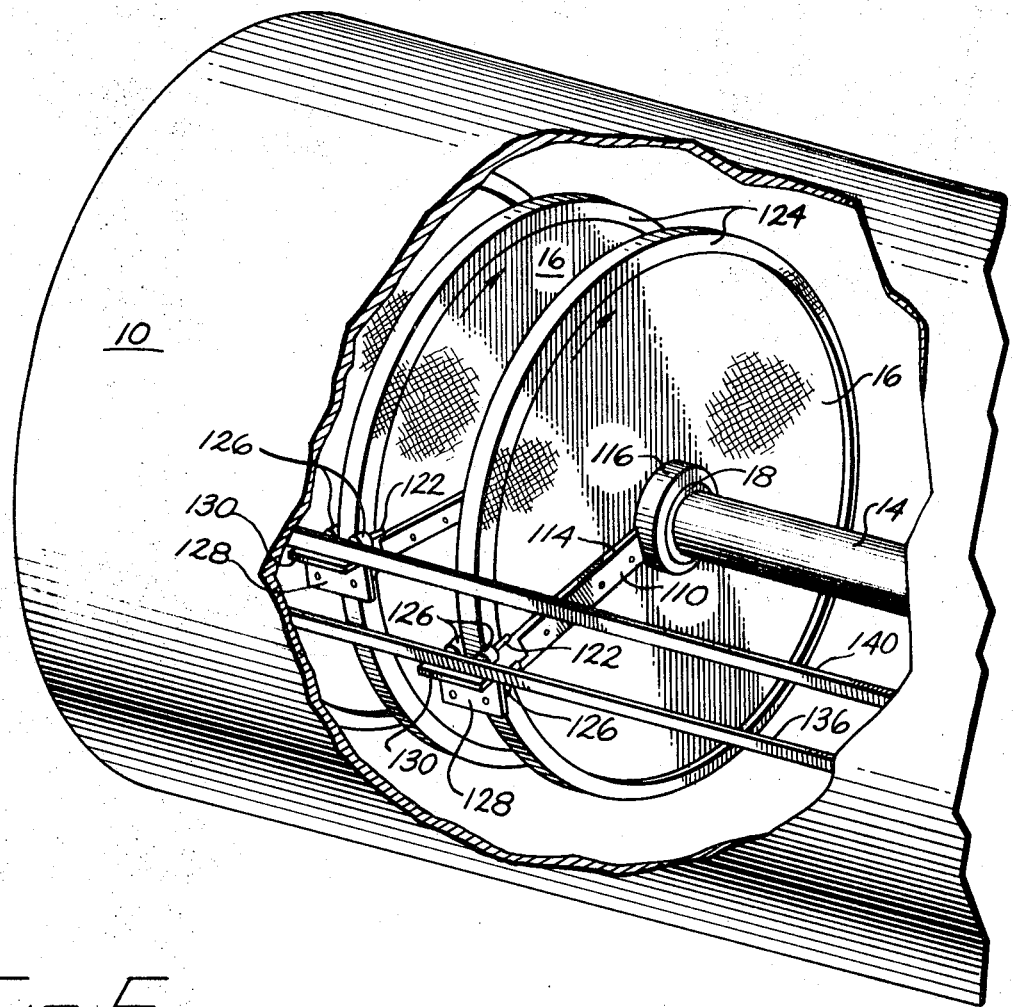
FIG. 3 is a fragmentary perspective view showing the adjustable knife blade of this invention mounted on a rotary filter leaf.
Figure 6:
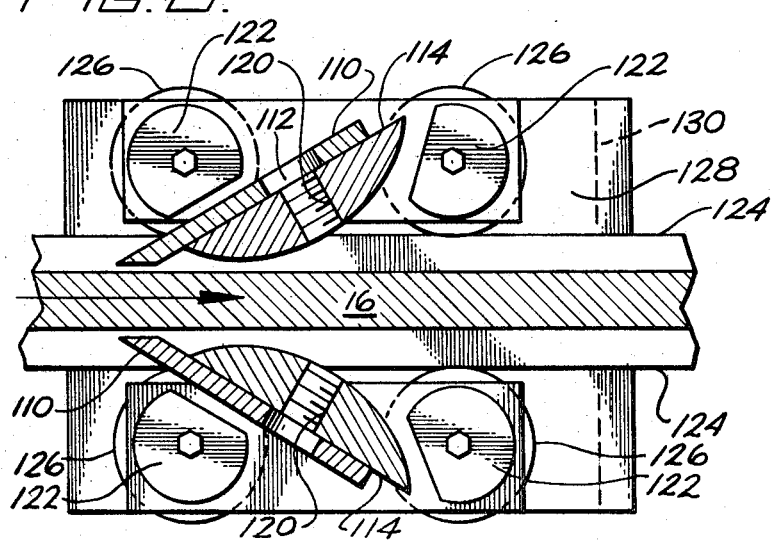
FIG. 6 is a sectional elevational view taken on line 6–6 of FIG. 4.

In a multileaf filter, each filter leaf carries its respective pair of knife blades. Preferably, a second elongated stop 140 is longitudinally disposed within the shell adjacent stop 136 and extends further into the shell than stop 136. The arms 130 of alternate brackets 138 are slightly longer than the arms of the remaining brackets so that the shorter arms clear stop 136 and strike stop 140, while the longer arms strike stop 136. In use, the knife blades of alternate leaves engage alternate stops, as shown in FIG. 3. This prevents the sudden overloading of drive motor 92 which rotates the shaft during cleaning.

Figure 2:
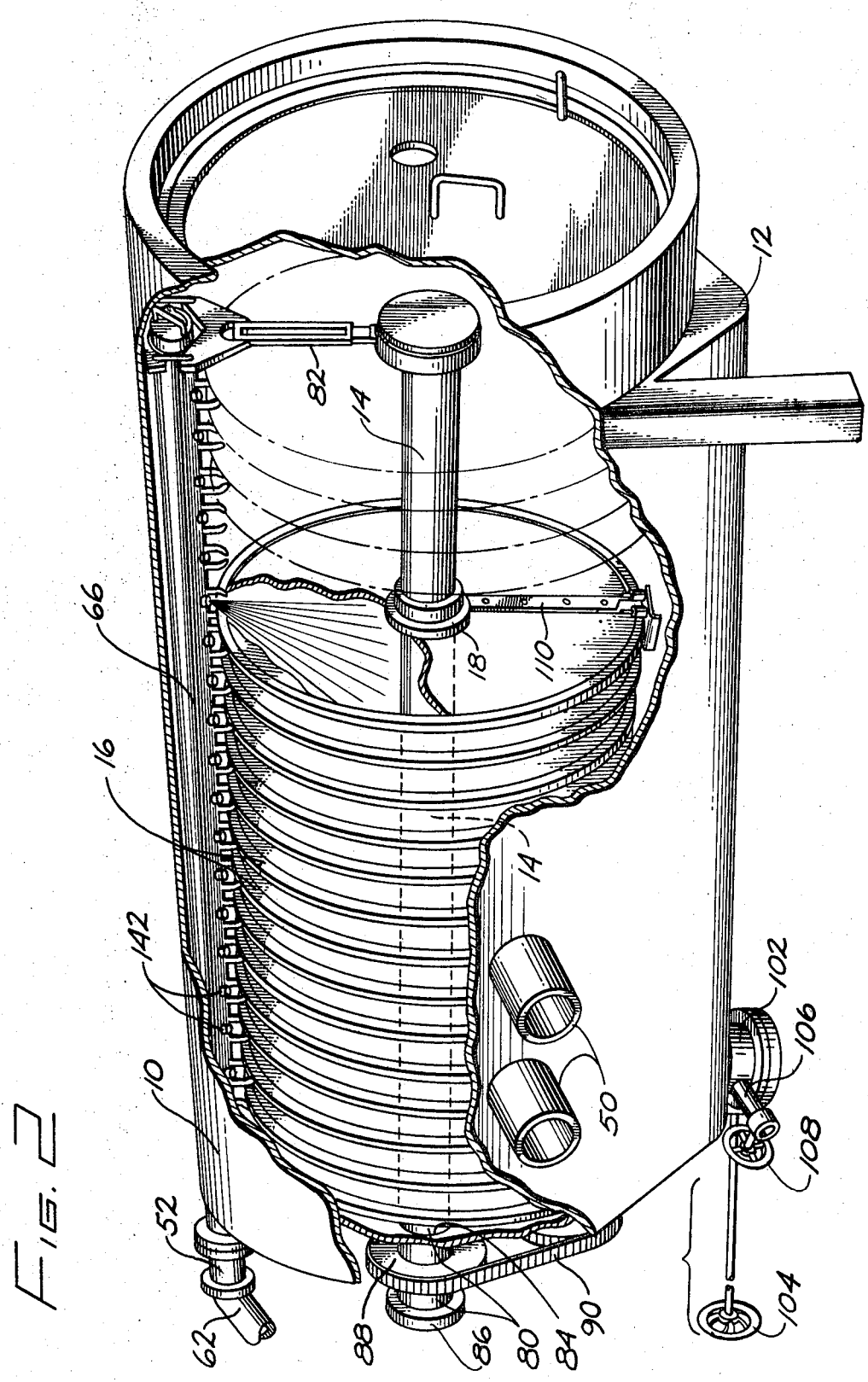
FIG. 2 is a perspective view, partially broken away, showing the opposite side of the filter shell of FIG. 1.

The removed cake falls into the trough and is removed by suitable means through drain pipe 102. The layer of filter aid retained on the leaves is removed and reslurried before being reapplied to the leaves. This step is necessary to obtain a uniform deposit of filter aid for the next filter cycle. In conventional filtration apparatus, the entire filter cake is sluiced from the leaves and discharged from the shell. Then the shell is filled and a layer of new precoat material is applied to the leaves. This invention contemplates sluicing the layer of filter aid from the leaves during the fill sequence of the next filtration cycle. In conventional filters, the shell is filled through a baffled main inlet line, such as that provided by inlet manifold 54 and inlet pipes 50. The baffles prevent erosion of the precoat layer and the filter cake during the precoat circulation sequence and the filter sequence, respectively. This invention does not contemplate filling the shell through the baffled main inlet, because the pressure through this line is not sufficient to remove and reslurry the precoat layer retained on the leaves from the preceeding cycle. Instead, clean liquid is introduced into the shell through auxiliary inlet 62 and internal spray header 66, and as a result, the leaves are sluiced and the precoat layer is slurried while the shell is being filled in preparation for the next filtration cycle. In this step, outlet valves 96 and 100 are closed, intake valves 57 and 60 are closed, and eductor gate valve 76 is closed. Then, inlet valves 34 and 64 are opened and clean liquid is delivered to the overhead spray header by pump 24 through the auxiliary flow line provided by pipe 62 and inlet pipe 52. A plurality of spray nozzles 142 are disposed along the longitudinal axis of the header to project high-pressure jets of spray onto the filter leaf surfaces. During cleaning, the leaves are rotated by motor 92, and the spray peels off the layer of precoat from the leaves, as shown in FIG. 2. The spray action also slurries the precoat layer within the shell. After the shell is filled, inlet valve 64 is closed, and return valve 100 and intake valve 34 are opened, and the precoat slurry is recirculated through the shell by pump 24 to deposit a layer of filter aid on the leaves in preparation for the next filtration cycle.

I claim:

1. A method for precoating a filter leaf disposed within the shell of a liquid filtering apparatus, the method comprising the steps of:
    a. applying a layer of precoat media to the surface of the leaf;
    b. forcing liquid into the leaf to form a filter cake on the layer;
    c. discharging the liquid from the shell so that the filter cake remains on the leaf;
    d. removing the filter cake from the precoat layer so that a substantial portion of the precoat layer remains on the leaf;
    e. discharging the removed filter cake from the shell;
    f. removing the remaining precoat media from the leaf;
    g. slurrying the precoat media; and
    h. reapplying the precoat media to the leaf to serve as the precoat layer for the succeeding filtration cycle.

2. The method according to claim 1 wherein the precoat media is slurried within the shell.

3. The method according to claim 1 wherein the steps of removing and slurrying the precoat media occur concurrently.

4. The method according to claim 1 including the steps of filling the shell with a suitable liquid before the layer of precoat media is applied to the leaf and refilling the shell with a suitable liquid before the precoat media is reapplied to the leaf for the succeeding filtration cycle.

5. The method according to claim 4 wherein the steps of removing and slurrying the precoat media occur while the shell is being refilled.

6. The method according to claim 1 wherein the remaining precoat media is removed from the leaf by projecting a spray of liquid onto the surface of the leaf.

7. The method according to claim 4 wherein the shell is refilled by projecting a spray of liquid onto the surface of the leaf.

8. The method according to claim 1 including the step of allowing the filter cake to attain at least a semidry condition prior to its removal from the leaf.

9. The method according to claim 1 wherein the filter cake is removed from the precoat layer by disposing an elongated adjustable knife blade adjacent the surface of the leaf so that the blade extends outwardly from the central portion of the leaf to its periphery; adjusting the space between the knife blade and the leaf to set the desired thickness of precoat media left on the leaf; and effecting relative rotation of the knife blade and the leaf so that the desired amount of filter cake is cut off the leaf by the blade as the leaf and the blade rotate relative to each other.

10. The method according to claim 9 including the steps of securing stop means to the interior of the shell so that the blade is engageable with the stop means, and rotating the leaf and filter cake on it so that the blade engages the stop means and is prevented from rotating with the leaf, whereby the cake is cut off the leaf by the blade as the leaf rotates relative to the blade.

11. A liquid filtering apparatus comprising a shell; a filter leaf disposed within the shell; means for applying a layer of precoat media to the surface of the leaf; means for forcing liquid into the leaf to form a filter cake on the precoat layer; means for discharging the liquid from the shell so that the filter cake remains on the leaf; an elongated knife blade disposed adjacent the face of the filter leaf to cut the filter cake off the leaf so that a substantial portion of the precoat media remains on the leaf; means for discharging the removed filter cake from the shell; means for removing the remaining precoat media from the leaf; means for slurrying the removed precoat media; and means for reapplying the precoat media to the leaf to serve as the precoat layer for the succeeding filtration cycle.

12. Apparatus according to claim 11 wherein the means for removing and slurrying the precoat media comprises spray means disposed within the shell for projecting a spray of liquid onto the surface of the leaf.

13. Apparatus according to claim 11 including means for effecting relative rotation of the knife blade and the leaf to cut the filter cake off the surface of the leaf.

14. Apparatus according to claim 11 including means for adjusting the space between the blade and the leaf so that the desired amount of cake can be removed from the leaf.

15. Apparatus according to claim 11 wherein the knife blade extends outwardly from the central portion of the leaf to its periphery; and including means for rotating the leaf and the filter cake on it, and stop means secured to the interior of the shell to engage the blade and prevent it from rotating with the leaf so that the desired amount of filter cake is cut off the leaf by the blade as the leaf rotates relative to the blade.

16. Apparatus according to claim 15 wherein the filter leaf is mounted on an elongated rotatable shaft disposed axially within the shell, and the knife blade is secured at its inner end to the shaft.

17. Apparatus according to claim 15 wherein the outer end of the knife blade is supported by rollers which ride on the perimeter of the filter leaf.

18. Apparatus according to claim 15 wherein the means for adjusting the space between the blade and the leaf comprises an elongated carrying bar adapted to longitudinally support the knife blade, a plurality of slotted holes extending lengthwise along the blade, a plurality of threaded holes disposed in the surface of the carrying bar adjacent the slotted holes, and bolts extending through the slotted holes into the holes of the carrying bar to secure the blade to the surface of the carrying bar, such that the blade is slidable laterally along the surface of the carrying bar toward or away from the surface of the leaf.

19. Apparatus according to claim 11 wherein a plurality of filter leaves are disposed within the shell, a knife blade is disposed adjacent the face of each leaf, and a plurality of angularly displaced stop means are secured to the interior of the shell to engage the knife blades at a plurality of locations about the periphery of the leaves so that the filter cake is cut off the face of each leaf by its corresponding blade at a different location with reference to the adjacent leaves.